Patented Jan. 27, 1942

2,271,319

UNITED STATES PATENT OFFICE 2,271,319

CONVERSION OF HYDROCARBON OILS

Charles L. Thomas and Jacob Elston Ahlberg, Chicago, Ill., assignors to Universal Oil Products Company, Chicago, Ill., a corporation of Delaware No Drawing. Application January 6, 1941, Serial No. 373,311

16 Claims. (Cl. 196—52)

This is a continuation-in-part of our copending application Serial No. 176,648, filed November 26, 1937, which has matured into Patent 2,229,353.

This invention relates to the conversion of hydrocarbon fractions produced in distilling petroleum oils and especially those of a distillate character which are vaporizable without substantial decomposition.

In a more specific sense the invention is concerned with a modification of hydrocarbon oil conversion processes involving the use of particular and specific types of catalysts which function to selectively promote the formation of low boiling gasoline fractions.

The art of cracking relatively heavy hydrocarbons to produce primarily gasoline or gas is very extensive and it is recognized that most of the basic principles of hydrocarbon decomposition are known and that particular commercial processes have been developed which embody these principles. The application of catalysts, however, in cracking reactions is practically upon the same basis as it is in other fields, that is, there is much more to be learned about them. A considerable number of the catalysts developed for cracking have a tendency to accelerate reactions leading to the formation of gas rather than of gasoline, this being particularly evidenced by reduced metal catalyst such as nickel or iron and many of such catalysts are sensitive to sulfur poisoning and are quickly coated with carbonaceous materials which render them practically inert. This deposition of carbonaceous materials is many times related to the type of decomposition reactions selectively fostered by the catalyst.

The present invention is concerned with the use of catalytic materials which are specially adapted to accelerate the cracking of heavy distillate fractions of petroleum and other hydrocarbonaceous materials to increase the rate of production of high antiknock gasoline-boiling range fractions and gaseous by-products which contain unusually high percentages of readily polymerizable olefins which are a potential source of further gasoline yields. The preferred catalysts for the process are characterized by selectivity in accelerating gasoline-forming reactions rather than light gas-forming reactions, by their selectivity in producing high antiknock gasoline, by their refractory character which enables them to retain their catalytic properties under severe conditions of temperature and pressure, by their ease and simplicity of manufacture and their exact reproducibility.

In one specific embodiment the present invention comprises a method for converting hydrocarbon distillate fractions containing substantially no gasoline into material yields of gasoline and gases containing relatively high percentages of polymerizable olefins by subjecting the vapors of such distillates at elevated temperatures and substantially atmospheric pressure to contact with granular silica-alumina catalysts prepared by special methods of precipitation and/or mixing and further treated by special washes to remove substantially all alkali metal ions and calcined at elevated temperatures to produce highly refractory alumina-silica particles which are able to withstand for long periods of time the alternate service and reactivation periods.

We have found that the alumina-silica catalysts whose use characterizes the present cracking process and which may be prepared by several alternate methods described in more detail in succeeding paragraphs are rendered much more active and selective in accelerating gasoline-forming reactions in cracking when the originally precipitated hydrated alumina and hydrated silica which go to form the primary composites in various proportions are completely freed from alkali metal ions which in most instances will be sodium ions because the sodium salts of silicic acids are cheapest and most readily available for the manufacture of this type of catalyst. The primary step in the method of preparing the catalysts whose use in cracking characterizes the present invention may be varied somewhat and the following is a general summary of the alternative modes of operation which may be employed:

1. Solutions of soluble alkali metal silicates and soluble aluminum salts, the latter including soluble aluminates, may be mixed in varying proportions to jointly precipitate hydrated alumina and hydrated silica.

2. Hydrated silica and hydrated alumina may be separately precipitated and the precipitates mixed in the wet condition. In the case of silica a convenient method is to acidify a solution of an alkali metal silicate to precipitate a silica gel. In the case of alumina the desired hydroxide may be precipitated by the addition of alkalis, particularly ammonium hydroxide although other precipitants such as ammonium carbonate, ammonium hydrosulfide or ammonium sulfide may be employed.

3. A separately precipitated hydrated silica may be added to an aqueous solution of an aluminum salt and the hydrated alumina precipitated in the presence of the suspended silica by the addition of alkaline precipitants.

4. A separately precipitated hydrated alumina may be added to an alkali metal silicate and the silica precipitated in the presence of the alumina by the addition of just the required amount of acid which is insufficient to redissolve the alumina.

It can be seen from the above that any method of obtaining a primary mix of hydrated silica and hydrated alumina may be employed within the scope of the invention although obviously the character and efficiency of the ultimately prepared alumina-silica masses will vary somewhat with the exact conditions of precipitation and the ratio of alumina to silica. For example, one proportion may furnish catalysts better for use in reforming a certain gasoline boiling range material, another may be better for use in the cracking of a gas-oil distillate and still another may be better adapted to cracking still heavier fractions.

An important feature of the present invention resides in the fact that cracking operations, particularly in petroleum distillates, may be conducted with greatly increased efficiency when silica-alumina catalysts are employed which have been subjected to treatment to effect substantially complete removal of alkali metal ions from the primary hydrated alumina-silica masses prior to their calcining to prepare them for service. It is not known whether the alkali metal salts such as sodium are present in the primary hydrated composites in chemical combination or in an adsorbed state but it has been definitely determined that their removal is necessary if catalysts of superior value in accelerating cracking reactions are to be obtained. It is probable that the presence of these alkali metal ions causes a sintering or fusion of the surfaces of the primary composites during the heating period so that the porosity of the catalyst particles is much reduced with a corresponding reduction in effective surface, considering the catalytic effects to be due at least in part to surface action. However, such concepts are principally speculations in view of the difficulty of obtaining direct confirmatory evidence.

In preparing catalyst for the process several alternative methods are available applicable to different primary hydrated silica-hydrated alumina composites to insure the substantially complete absence of sodium or other alkali metal ions. One method consists in washing the primary hydrated silica with sufficient quantities of hydrochloric acid to extract alkali metal by the formation of chlorides and possibly introduce hydrogen into the catalyst composites. Thus a precipitated hydrated silica mass may be first washed by decantation with water and filtered by pressure or suction to remove the major portion of the soluble impurities. The precipitate is then removed from the filter and treated with relatively dilute hydrochloric acid, washed any necessary number of times and again transferred to a pressure or suction filter and freed from the major portion of the adhering water. As an alternative method for removal of alkali metals which may be present in the chemically combined or adsorbed condition, the precipitated silica may be washed with solutions of ammonium chloride which apparently serves to replace sodium with ammonium, which is later volatilized in the drying and calcining of the silica either before or after admixture with the alumina. The desired amount of hydrated alumina may be precipitated on the siliceous material or freshly precipitated hydrated alumina may be added and mechanically mixed therewith.

Another method which has been found to be efficacious in the preparation of cracking catalysts consists in washing the primary hydrated silica-hydrated alumina precipitates or composites with solutions of ammonium compounds such as, for example, the chloride or other halides, the sulfate, the nitrate, or the acetate, so that the ammonium ion appears as a constituent of the catalyst composite and is later expelled from combination or adsorption in the calcining steps, leaving a structure of relatively high porosity in so doing. As a variation of this method the co-precipitation or mixing of the primary hydrated silica and alumina may be brought about in the presence of ammonium hydroxide or any of the other salts of ammonium already mentioned in sufficient excess to insure an adequate removal of the alkali metal ion. In the case of co-precipitation it has been found that the necessary excess of ammonia is present at the point corresponding to a sufficient coagulation of the gel structure of the primary precipitates to permit ready filtering and washing. In other words if sufficient ammonia has been used to insure easy washing and filtering the alkali metal salts have been generally reduced to a point at which they no longer have any appreciable adverse influence on the catalyst properties.

The weight of evidence at hand on the mechanism leading to the replacement of alkali metals in the primary hydrated silica precipitates or the silica-alumina masses indicates that the alkali metals are held by adsorption rather than by chemical bonds. This is indicated by the fact that the alkali metal ions are replaceable by ammonium or multivalent positive ions which are known in general to be more strongly adsorbed than alkali metal ions. This differentiates this replacement from that occurring in the case of zeolites.

A still further alternative method of removing alkali metal salts from freshly precipitated hydrated silica or alumina-silica composites consists in treating such composites with salts of metals which can replace the sodium in a similar manner to that described in the case of ammonium chloride. For example, a primary composite containing undesirably large amounts of alkali metal even after repeated water washing may be again suspended in water and treated with a solution of salts of such metals as aluminum, magnesium, calcium, manganese, cerium, or other multivalent metals in which the metal forms the positive ion of the salt being used.

As a further example, the washing may first be with an acid solution and an ammonium salt solution as above described preliminary to treating with solutions of the multivalent salt solutions. Obviously such replacements may be allowed to proceed with consequent variation in the properties of the final catalyst. This method of operation permits the production of catalysts of a high degree of variability which are obviously non-equivalent in regard to their effect upon a given cracking reaction.

After a final washing of the hydrated alumina-silica mix, it is recovered as a filter cake by using any known type of suction or pressure filter and is then heated to a temperature of the order of 300° F. for a period of 36 to 48 hours after which it may be ground and sized to recover particles of a convenient average diameter or formed into any desired shapes by compression methods. It has been found that the drying at 300° F. produces material having a total water content of about 15% by weight which as already stated apparently corresponds to the best workability of the material. By calcining at cracking temperatures of the order of approximately 850–1000°

F., a further dehydration occurs so that for example after a considerable period of heating at 900° F., the water content as determined by analysis is of the order of 2–3% which is firmly fixed and does not appreciably vary either as the result of long service or a large number of reactivations at considerably higher temperatures.

Catalysts prepared by the above general procedure evidently possess a large total contact surface corresponding to a high porosity, the pores being of such size that hydrocarbon oil vapors are able to penetrate to a considerable distance and yet not so small that when the pores become clogged with carbonaceous deposits after a long period of service, they are difficult to reactivate by oxidation. This structure is also retained after many alternate periods of use and reactivation as evidenced by the fact that the catalysts may be repeatedly reactivated by passing air over the spent particles to burn off deposits of carbonaceous material at temperatures as high as 1400–1600° F. without material loss of catalytic activity.

According to the present process catalysts prepared by the general procedure described in the preceding paragraphs are utilized to the best advantage in cracking reactions when employed as filling material in tubes or chambers in the form of small pellets or granules. In the majority of cases wherein hydrocarbon fractions readily vaporizable at moderate temperatures without extensive decomposition are employed, the average particle size is within the range of 6–10 mesh, which may apply either to small pellets of uniform size and short cylindrical shape or to particles of irregular size and shape produced by the grinding and sizing of the partially dehydrated materials. While the simple method of preheating a given fraction of hydrocarbon oil vapors to a temperature suitable for their cracking in contact with the catalysts and then passing the vapors over a stationary mass of catalyst particles may be employed in some cases, it is usually preferable to pass the preheated vapors through banks of relatively small diameter catalyst-containing tubes in multiple connection between headers, since this arrangement of apparatus is better adapted to permit exterior heating of the catalyst tubes to compensate for the heat loss in the endothermic cracking reactions.

After the passage of the oil vapors over the catalyst, the products may be separated into material unsuitable for further cracking, intermediate insufficiently converted fractions amenable to further catalytic cracking, gasoline boiling range materials and gases, the intermediate fractions being returned directly to admixture with the charging stock so that ultimately there is complete recycling of all fractions and maximum utilization of the charging stock for gasoline production.

The present process besides being characterized by the use of novel catalysts is further characterized by the use of moderate temperatures, relatively low pressures and high throughputs in comparison with strictly thermal cracking processes in use at the present time. When dealing with intermediate distillate fractions of the character of gas oil, it is seldom necessary to employ temperatures greatly in excess of 950° F. in the catalytic conversion zone. In the matter of pressure, it is seldom desirable to employ those materially above atmospheric except in so far as this is necessary to insure a proper flow through the vaporizing and cracking zones and the succeeding fractionating equipment. However, since pressure increases the capacity of both cracking and fractionating units, moderately superatmospheric pressures may be employed when their use is dictated by the overall economy of the process. The times of catalytic contact are relatively short and of the order of 1–10 seconds.

The following examples of preparation and use of the types of catalysts peculiar to the present invention are given to indicate their novelty and utility in practical cracking processes although not for the purpose of limiting the invention in exact agreement with the data introduced.

*Example I*

The method of catalyst preparation in this case is to mix an alkali metal silicate and an acid to form a hydrated silica, mixing the hydrated silica with a solution of an aluminum salt and precipitating alumina and purifying the composite.

A solution is prepared containing 413 grams of water glass of approximately 40° Baumé in 5 liters of water. Approximately 500 cc. of 2.5 molar hydrochloric acid is slowly added to the diluted water glass solution while stirring. The silica hydrogel is filtered and washed with water and then suspended in approximately 500 cc. of water containing approximately 40 grams of aluminum chloride hexahydrate in solution. Ammonium hydroxide is then added to precipitate the alumina hydrogel in the presence of the hydrated silica and the composite of hydrated alumina and hydrated silica is then washed with a solution containing approximately 20 grams per liter of cerium chloride until the final washings are free from sodium when tested with a uranyl acetate reagent. The purified catalyst preparation is then recovered as a filter cake which is dried at approximately 932° F. When granules of the above prepared catalyst are disposed in a catalyst chamber and contacted with a Pennsylvania gas oil which has been vaporized and preheated to a temperature of 932° F. and passed through the catalyst at an hourly liquid space velocity of approximately 4, the following results are obtained:

*Data on cracking experiments*

| | Run #1 | Run #2 |
|---|---|---|
| Temperature average at center of catalyst bed, °F | 901 | 906 |
| Gasoline 400° F. E. P.: | | |
| Volume, per cent | 26.8 | 26.4 |
| A. P. I., °F | 61.3 | 61.0 |
| Octane number, motor method | 76.0 | 75.7 |
| Engler distillation: | | |
| I. B. P., °F | 87 | 82 |
| 10%, °F | 121 | 116 |
| 20%, °F | 146 | 147 |
| 30%, °F | 165 | 181 |
| 50%, °F | 233 | 254 |
| 70%, °F | 301 | 320 |
| 90%, °F | 364 | 369 |
| E. P., °F | 400 | 401 |
| Gases (boiling range below +10° C.): | | |
| Weight, per cent (total) | 6.2 | 5.8 |
| Molecular weight | 29.6 | 26.3 |
| Propene and butenes, weight per cent of charge | 4.2 | 3.6 |
| Gas oil recovered (recycle stock): | | |
| Volume, per cent | 67.3 | 68.0 |
| A. P. I., 60° F | 38.7 | 38.9 |

*Example II*

The procedure in preparing the catalyst in this example is to precipitate a hydrated silica by adding an acid to a water glass solution, washing the hydrated silica free from alkali metal ions and precipitating the hydrated alumina in the presence of the suspended purified hydrated silica by the addition of an alkaline precipitant free from alkali metal impurities.

About 415 grams of approximately 40° Baumé water glass is diluted with 5 liters of water and approximately 500 cc. of 2.5 molar hydrochloric acid is added thereto gradually while stirring to precipitate a hydrated silica. The hydrated silica is washed several times with water and then with a solution containing approximately 25 grams of cerium chloride per liter until the washings are free from sodium when testing with a uranyl acetate reagent. The purified silica hydrogel is then suspended in approximately 500 cc. of water containing 40 grams of aluminum chloride hexahydrate and hydrated alumina precipitate in the presence of the silica hydrogel by the addition of ammonium hydroxide. The composite of hydrated silica and hydrated alumina is then recovered as a filter cake and dried at a temperature of approximately 275° F. The dried material is crushed to pass a 40 mesh screen, mixed with a lubricant and pilled to form ⅛-inch pellets. The pilled catalyst is calcined at a temperature of approximately 1500° F.

A Mid-Continent gas oil is vaporized and preheated to a temperature of approximately 932° F. and is contacted with the pelleted catalyst above described at substantially atmospheric pressure in a once-through operation. Approximately 22.5 per cent by volume of the charge of 400° F. end-point gasoline is produced having octane number of 77.5

We claim as our invention:

1. A process for converting hydrocarbon distillates heavier than gasoline into substantial yields of gasoline which comprises subjecting said distillate under cracking conditions to contact with a catalyst produced by separately precipitating hydrated aluminum oxide and hydrated silicon dioxide containing alkali metal ions, freeing the precipitated materials of alkali metal ions, by treating with a solution of a salt of cerium, mixing the purified materials in the wet condition, and drying to remove a major portion of the total water content.

2. A process for converting hydrocarbon distillates heavier than gasoline into substantial yields of gasoline which comprises subjecting said distillates under cracking conditions to contact with a catalyst free of alkali metal compounds and produced by separately precipitating hydrated aluminum oxide and hydrated silicon dioxide containing alkali metal ions, mixing said separately produced precipitates in a wet condition, adding a sufficient quantity of a cerium compound to replace combined or adsorbed alkali metal ions present in the precipitate with cerium, filtering and washing the precipitated material to substantially complete removal of soluble substances and heating the washed precipitate to remove the major portion of its total water content.

3. A process for converting a hydrocarbon distillate heavier than gasoline into substantial yields of gasoline which comprises subjecting said distillate under cracking conditions to contact with a catalyst free of alkali metal compounds and produced by separately precipitating hydrated aluminum oxide and hydrated silicon dioxide, adding a sufficient quantity of a solution of a cerium salt to a suspension of the hydrated silicon dioxide to replace combined or adsorbed alkali metal ions with cerium, mixing said separately produced precipitates in a wet condition, filtering and washing the precipitated material to substantially complete removal of soluble substances and heating the washed precipitate to remove the major portion of its total water content.

4. A process for converting hydrocarbon distillates heavier than gasoline into substantial yields of gasoline which comprises subjecting said distillates under cracking conditions to contact with a catalyst free of alkali metal compounds and produced by separately precipitating hydrated aluminum oxide and hydrated silicon dioxide, treating said hydrated silicon dioxide with a solution of a cerium salt to remove combined or adsorbed alkali metal ions, mixing said separately produced precipitates in a wet condition, filtering and washing the precipitated material to substantially complete removal of soluble substances and heating the washed precipitate to remove the major portion of its total water content.

5. A process for converting hydrocarbon distillates heavier than gasoline into substantial yields of gasoline which comprises subjecting said distillates under cracking conditions to contact with a catalyst free of alkali metal compounds and produced by separately precipitating hydrated aluminum oxide from a solution of a soluble aluminate and hydrated silicon dioxide by the acidification of alkali metal silicate solution, mixing said separately produced precipitates in a wet condition, adding a sufficient quantity of a cerium salt to replace combined or adsorbed alkali metal ions present in the precipitate with cerium, filtering and washing the precipitated material to substantially complete removal of soluble substances and heating the washed precipitate to remove the major portion of the total water content.

6. A process for converting hydrocarbon distillates heavier than gasoline into substantial yields of gasoline which comprises subjecting said distillate under cracking conditions to contact with a catalyst produced by precipitating hydrated aluminum oxide from an aqueous solution of a soluble aluminum compound, separately precipitating hydrated silicon dioxide from an aqueous solution of an alkali metal silicate, combining the precipitates in undried condition and removing from the hydrated silicon dioxide alkali metal ions present therein as a result of its precipitation from the alkali metal silicate solution by washing with a solution of a cerium salt, and calcining the commingled precipitates.

7. A conversion process which comprises contacting normally liquid hydrocarbon oil under cracking conditions with a catalyst produced by precipitating hydrated silicon dioxide containing alkali metal ions, precipitating hydrated aluminum oxide, treating resultant precipitated material, containing said alkali metal ions, with an aqueous solution of a cerium compound and combining the precipitated aluminum oxide and silicon dioxide in undried condition, and drying the mixture to remove the major portion of its water content.

8. The process as defined in claim 7 further characterized in that the hydrated aluminum oxide is substantially free of alkali metal ions and the hydrated silicon dioxide is treated with said solution prior to combining it with the hydrated aluminum oxide, the latter being precipitated in the presence of the hydrated silicon dioxide.

9. The process as defined in claim 7 further characterized in that the aluminum oxide and silicon dioxide are co-precipitated and the admixed precipitates treated with said solution.

10. The process as defined in claim 7 further characterized in that the aluminum oxide and silicon dioxide are precipitated independently of each other.

11. The process as defined in claim 7 further characterized in that said oil is a distillate heavier than gasoline.

12. A conversion process which comprises subjecting the hydrocarbon oil to cracking conditions in the presence of a calcined mixture of separately precipitated alumina hydrogel and silica hydrogel, said hydrogels having been combined in undried condition prior to the calcination and said silica hydrogel having been substantially freed of alkali metal compounds by washing with a solution of a salt of cerium.

13. The process as defined in claim 12 further characterized in that the silica hydrogel is precipitated prior to the alumina hydrogel and the latter thereafter precipitated in the presence of the silica hydrogel.

14. The process as defined in claim 12 further characterized in that the silica hydrogel is precipitated prior to the alumina hydrogel and suspended in an aqueous aluminum salt solution, the alumina hydrogel being combined with the silica hydrogel by precipitating the same from said solution in the presence of the silica hydrogel.

15. A conversion process which comprises contacting normally liquid hydrocarbon oil under cracking conditions with a catalyst produced by precipitating hydrated silicon dioxide containing alkali metal ions, precipitating hydrated aluminum oxide, treating resultant precipitated material containing said alkali metal ions with an aqueous acid solution and with a solution of a cerium salt to remove alkali metal ions and combining the precipitated aluminum oxide and silicon dioxide in undried condition, and drying the mixture to remove a major portion of its water content.

16. The process as defined in claim 15 further characterized in that the hydrated aluminum oxide is substantially free from alkali metal ions and the hydrated silicon dioxide is treated with said solutions prior to combining it with the hydrated aluminum oxide, the latter being precipitated in the presence of the hydrated silicon dioxide.

CHARLES L. THOMAS.
JACOB ELSTON AHLBERG.